United States Patent
Neto

(10) Patent No.: US 7,774,729 B1
(45) Date of Patent: Aug. 10, 2010

(54) METHOD AND APPARATUS FOR REDUCING DYNAMIC POWER IN A SYSTEM

(75) Inventor: David Neto, Toronto (CA)

(73) Assignee: Altera Corporation, San Jose, CA (US)

( * ) Notice: Subject to any disclaimer, the term of this patent is extended or adjusted under 35 U.S.C. 154(b) by 130 days.

(21) Appl. No.: 11/807,437

(22) Filed: May 29, 2007

Related U.S. Application Data

(60) Provisional application No. 60/810,774, filed on Jun. 2, 2006.

(51) Int. Cl.
*G06F 17/50* (2006.01)
(52) U.S. Cl. .............................. 716/6; 716/4
(58) Field of Classification Search ............. 716/4–6
See application file for complete search history.

(56) References Cited

U.S. PATENT DOCUMENTS

| | | | | |
|---|---|---|---|---|
| 6,957,403 | B2 * | 10/2005 | Wang et al. | 716/3 |
| 7,017,132 | B2 * | 3/2006 | Hou et al. | 716/6 |
| 7,127,695 | B2 * | 10/2006 | Huang et al. | 716/10 |
| 7,296,249 | B2 * | 11/2007 | Rinderknecht et al. | 716/4 |
| 2004/0015803 | A1 * | 1/2004 | Huang et al. | 716/10 |
| 2005/0268265 | A1 * | 12/2005 | Ly et al. | 716/6 |

* cited by examiner

*Primary Examiner*—Jack Chiang
*Assistant Examiner*—Binh C Tat
(74) *Attorney, Agent, or Firm*—L. Cho

(57) ABSTRACT

A method for designing a system on a target device includes inserting sequential elements into combinatorial logic bounded by a source sequential element and a destination sequential element to reduce glitching. The sequential elements are clocked with a clock signal having a phase difference from at least one of a clock signal clocking the source sequential element and the destination sequential element.

24 Claims, 10 Drawing Sheets

METHOD AND APPARATUS FOR REDUCING DYNAMIC POWER IN A SYSTEM

RELATED APPLICATION

This application claims priority to provisional U.S. patent application Ser. No. 60/810,774 filed Jun. 2, 2006, titled "Method for Reducing Dynamic Power by Functionality Preserving Insertion of Sequential Logic", the full and complete subject matter of which is hereby expressly incorporated by reference in its entirety.

TECHNICAL FIELD

The present invention relates to the field of field programmable gate arrays (FPGAs) and other target devices. More specifically, the present invention relates to a method and apparatus for reducing dynamic power in a system.

BACKGROUND

Circuits in systems consume dynamic power whenever logic and routing toggle, i.e. change values between 0 and 1. Some toggles are necessary because they represent the intended change in the value of a signal and reflect the final value of the logic for a clock period. Other toggles reflect intermediate values computed by combinatorial logic and are referred to as glitches. Glitches are unwanted because they do not reflect the final value of a combinatorial logic gate for a clock period and consumes power.

For example, consider an observable point in a circuit, P. The inputs of a combinatorial cone of logic driving P is referred to as Support(P). Changes in the value observed at P are caused by changes in Support(P). Glitches may be observed at P whenever multiple transitions occur at P within a single clock period. All transitions except the last are deemed to be glitches. Multiple transitions observed at P may be caused by transitions in the values in Support(P). The multiple transitions may occur in Support(P) and the effects of the multiple transitions arrive at P at different times. Alternatively, a single change in Support(P) may be propagated through multiple paths through the combinatorial logic and those paths may have differing delay.

FIGS. 1a and 1b illustrate an example of glitching. FIG. 1a illustrates an exemplary circuit with input registers RA 101, RB 102, RC 103, an XOR gate Fgate 104, and output register RF 105. In this example, the propagation delay is 1 unit from the output of RA to the input of Fgate, 2 units from the output of RB to the input of Fgate, 5 units from the output of RC to the input of Fgate, 1 unit from each input of Fgate to the output of Fgate, and 1 unit from the output of Fgate to RF. The inputs of the combinatorial cone of logic driving F is Support (F)={RA, RB, RC}. Assuming that the clock skew is negligible and that all three input registers RA, RB, and RC change at the same time, the observed value at F will change three times, once for each change by an input register. The first two changes are glitches, and the last change reflects the final value of the function for that clock cycle. FIG. 1b illustrates an exemplary timing diagram for the circuit shown in FIG. 1a.

Some types of logic are more susceptible to glitching than others. Logic such as XOR gates, Adders, Multipliers, Multiplexors, crossbars, and barrel shifters tend to be more susceptible to glitching because they tend to generate a change in output in response to any change in their inputs. An AND gate, however, is not susceptible to glitching because it is sensitive to an input bit only if all the other inputs are 1, which is a small fraction of its input space. Glitches are especially harmful when the logic cone is deep. A glitch in an early stage of the logic cone will often propagate through the rest of the logic, and cause a cascade of wasted power.

Thus, what is needed is an efficient and effective method and apparatus for addressing glitching to reduce the dynamic power requirement of a system.

SUMMARY

According to an embodiment of the present invention, glitches are eliminated in circuits of a system by insertion of one or more stages of pipeline sequential elements into glitch-prone combinatorial cones of logic. The sequential elements only change value at most once per clock cycle and prevent glitches from propagating downstream, effectively filtering glitches out of the system. The insertion of sequential elements in the circuits of the system may, however, increase the latency of the system. In order to preserve the original timing of the system, the clock signal transmitted to the inserted sequential elements are phase shifted. The phase in which to shift each set of pipelined sequential elements are determined based upon on the number of sets of pipelined sequential elements inserted into a combinatorial cone of logic.

BRIEF DESCRIPTION OF THE DRAWINGS

The features and advantages of the embodiments of the present invention are illustrated by way of example and are by no means intended to limit the scope of the embodiments of the present invention to the particular embodiments shown.

FIG. 1b is an exemplary timing diagram that illustrates glitching experienced by the circuit shown in FIG. 1a.

DETAILED DESCRIPTION

In the following description, for purposes of explanation, specific nomenclature is set forth to provide a thorough understanding of embodiments of the present invention. It will be apparent to one skilled in the art that specific details in the description may not be required to practice the embodiments of the present invention. In other instances, well-known circuits, devices, and programs are shown in block diagram form to avoid obscuring embodiments of the present invention unnecessarily.

Figure 2:
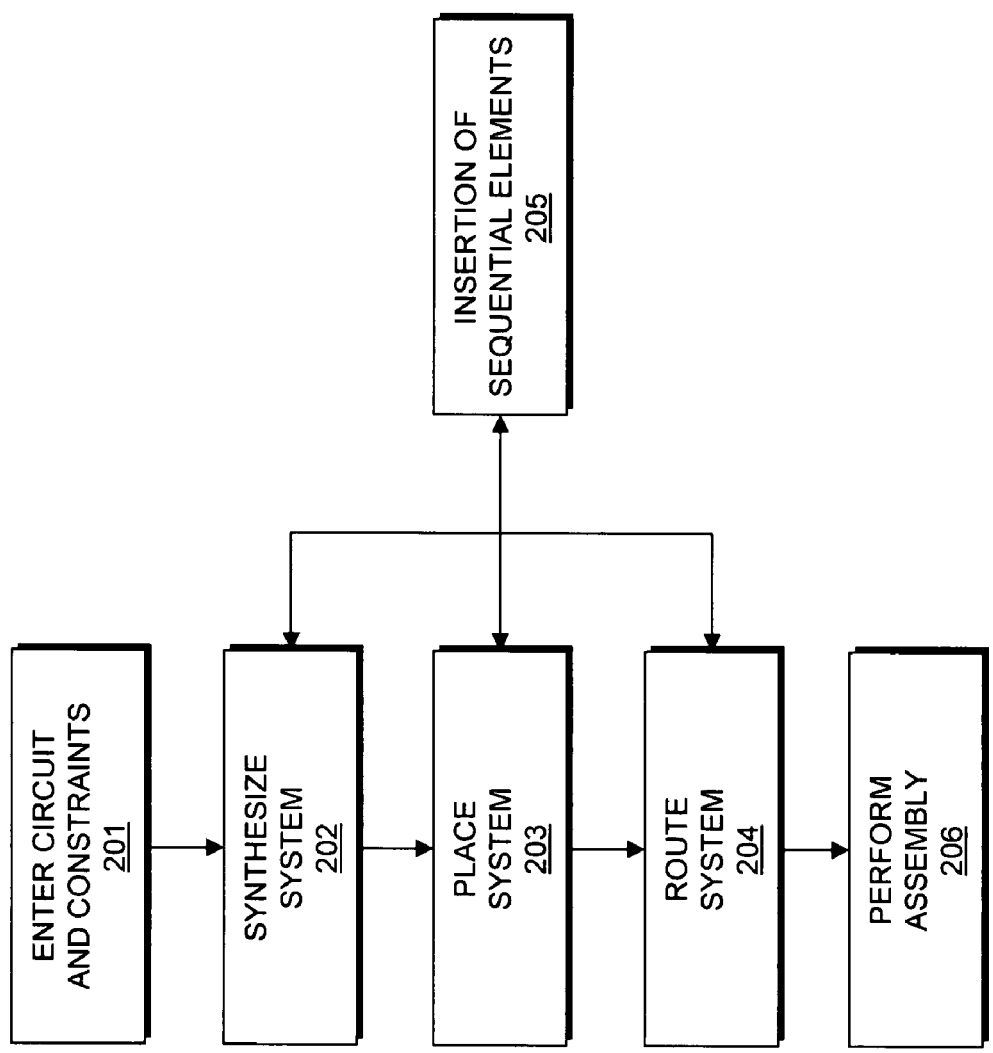
FIG. 2 is a flow chart that illustrates a method for designing a system on a target device according to an embodiment of the present invention.

FIG. 2 is a flow chart illustrating a method for designing a system on a target device according to an embodiment of the present invention. The target device may be an integrated circuit such as a field programmable gate array (FPGA), a structured application specific integrated circuit (ASIC), or other circuit. The method described in FIG. 2 may be implemented as a computer aided design (CAD) flow executed on a system designer. At 201, circuit and constraint entries are made. According to an embodiment of the present invention, a user may specify their circuit design and constraints associated with the implementation of the system. For example, the user may provide a circuit description in a hardware description language (HDL) such as VHSIC HDL (VHDL) or Verilog. The user may specify constraints on the implementation such as timing constraints, power budgets, or other constraints.

At 202, the system is synthesized. Synthesis includes generating a logic design of the system to be implemented by the target device. According to an embodiment of the present invention, synthesis generates an optimized logical representation of the system from a HDL design definition. The optimized logical representation of the system may include a representation that has a minimized number of functional blocks and registers, such as logic gates and logic elements, required for the system. Synthesis also includes mapping the optimized logic design. Mapping includes determining how to implement logic gates and logic elements in the optimized logic representation with specific resources on the target device. According to an embodiment of the present invention, a netlist is generated from mapping. This netlist may be an optimized technology-mapped netlist generated from the HDL.

At 203, the mapped logical system design is placed. Placement works on the optimized technology-mapped netlist to produce a placement for each of the functional blocks. According to an embodiment of the present invention, placement includes fitting the system on the integrated circuit by determining which resources on the integrated circuit are to be used for specific logic elements, and other functional blocks.

At 204 the system is routed. Routing involves determining how to connect the functional blocks in the system. According to an embodiment of the present invention, a cost function may be used to generate a cost associated with each routing option. The cost function may take into account, delay, capacitive loading, cross-sink loading, power, and/or other criteria.

At 205, sequential elements are inserted into the system design. According to an embodiment of the present invention, glitches are eliminated in circuits of the system by insertion of stages of pipeline sequential elements into glitch-prone combinatorial cones of logic. The sequential elements only change value at most once per clock cycle and prevent glitches from propagating downstream, effectively filtering glitches out of the system. In order to preserve the original timing of the system, the clock signal transmitted to the inserted sequential elements are phase shifted. The phase in which to shift each set of pipelined sequential elements are determined based upon on the number of sets of pipelined sequential elements inserted into a combinatorial cone of logic. It should be appreciated that the insertion of sequential elements may be made after any one or more of the synthesis, placement, or routing procedures 202-204. In order to accommodate the addition of sequential elements, incremental synthesis, placement, and/or routing may be performed without requiring entire design procedures described in FIG. 2 to be re-executed.

At 206, an assembly procedure is performed. The assembly procedure involves creating a data file or set of files that includes information determined by the procedures described by 201-205. The data file may be a bit stream that may be used to program the target device. According to an embodiment of the present invention, the procedures illustrated in FIG. 2 may be performed by an electronic design automation (EDA) tool executed on a first computer system. The data file generated may be transmitted to a second computer system to allow the design of the system to be further processed. Alternatively, the data file may be transmitted to a second computer system which may be used to program the target device according to the system design. It should be appreciated that the design of the system may also be output in other forms such as on a display device or other medium.

Figure 3:
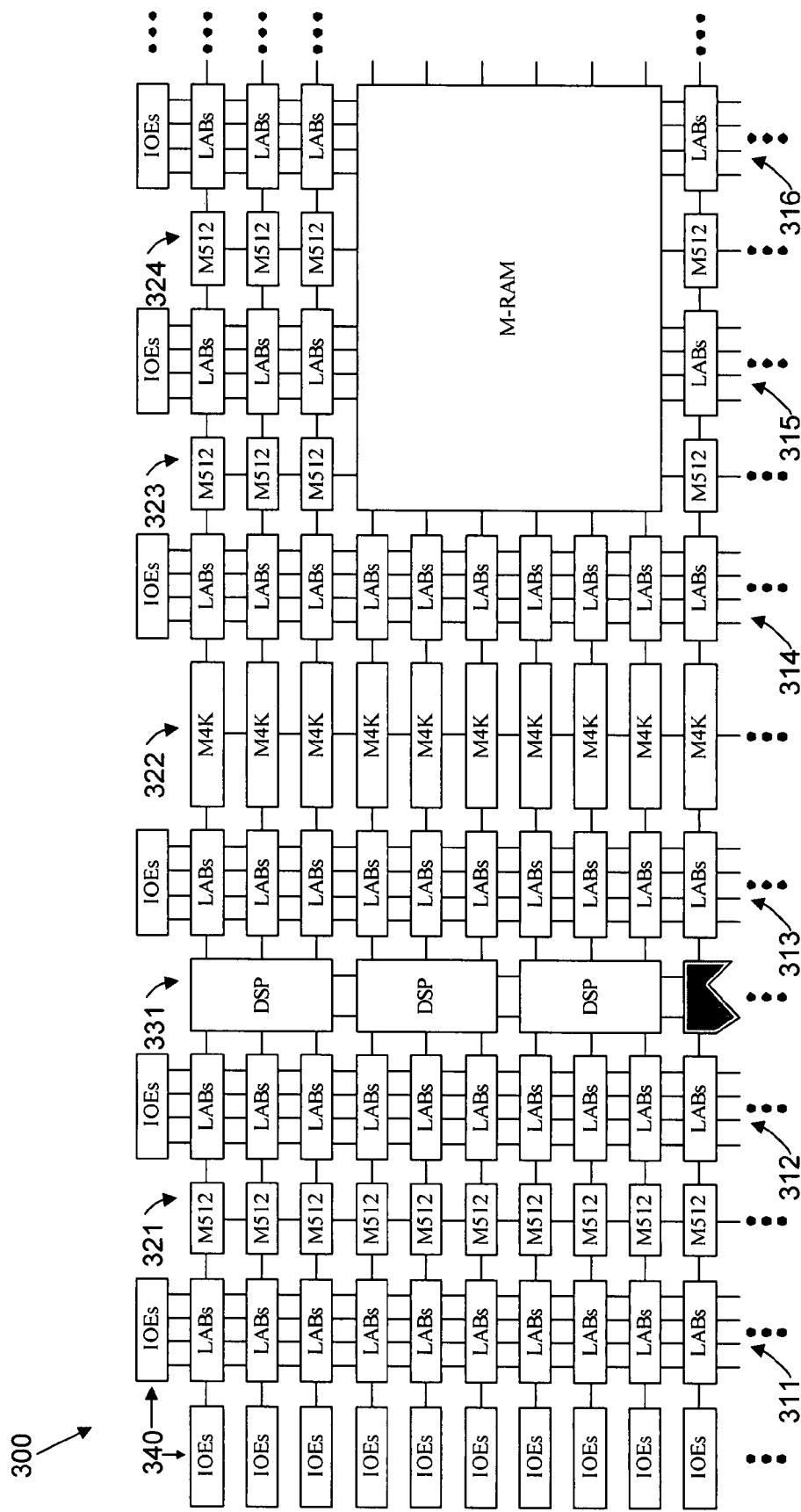
FIG. 3 illustrates a target device according to an embodiment of the present invention.

FIG. 3 illustrates an exemplary target device 300 in which a system may be implemented on utilizing an FPGA according to an embodiment of the present invention. According to one embodiment, the target device 300 is a chip having a hierarchical structure that may take advantage of wiring locality properties of circuits formed therein.

The target device 300 includes a plurality of logic-array blocks (LABs). Each LAB may be formed from a plurality of logic blocks, carry chains, LAB control signals, (lookup table) LUT chain, and register chain connection lines. A logic block is a small unit of logic providing efficient implementation of user logic functions. A logic block includes one or more combinational cells, where each combinational cell has a single output, and registers. According to one embodiment of the present invention, the logic block may operate similarly to a logic element (LE), such as those found in Stratix™ manufactured by Altera® Corporation, or a combinational logic block (CLB) such as those found in Virtex™ manufactured by Xilinx® Inc. LABs are grouped into rows and columns across the target device 300. Columns of LABs are shown as 311-316. It should be appreciated that the logic block may include additional or alternate components.

The target device 300 includes memory blocks. The memory blocks may be, for example, dual port random access memory (RAM) blocks that provide dedicated true dual-port, simple dual-port, or single port memory up to various bits wide at up to various frequencies. The memory blocks may be grouped into columns across the target device in between selected LABs or located individually or in pairs within the target device 300. Columns of memory blocks are shown as 321-324.

The target device 300 includes digital signal processing (DSP) blocks. The DSP blocks may be used to implement multipliers of various configurations with add or subtract features. The DSP blocks include shift registers, multipliers, adders, and accumulators. The DSP blocks may be grouped into columns across the target device 300 and are shown as 331.

The target device 300 includes a plurality of input/output elements (IOEs) 340. Each IOE feeds an I/O pin (not shown) on the target device 300. The IOEs are located at the end of LAB rows and columns around the periphery of the target device 300. Each IOE includes a bidirectional I/O buffer and a plurality of registers for registering input, output, and output-enable signals. When used with dedicated clocks, the registers provide performance and interface support with external memory devices.

The target device 300 includes LAB local interconnect lines (not shown) that transfer signals between LEs in the same LAB. The LAB local interconnect lines are driven by column and row interconnects and LE outputs within the same LAB. Neighboring LABs, memory blocks, or DSP blocks may also drive the LAB local interconnect lines through direct link connections.

The target device 300 also includes a plurality of row interconnect lines ("H-type wires") (not shown) that span fixed distances. Dedicated row interconnect lines, route signals to and from LABs, DSP blocks, and memory blocks within the same row. The row interconnect lines may span a distance of up to four, eight, and twenty-four LABs respectively, and are used for fast row connections in a four-LAB, eight-LAB, and twenty-four-LAB region. The row interconnects may drive and be driven by LABs, DSP blocks, RAM blocks, and horizontal IOEs.

The target device 300 also includes a plurality of column interconnect lines ("V-type wires") (not shown) that operate similarly to the row interconnect lines. The column interconnect lines vertically routes signals to and from LABs, memory blocks, DSP blocks, and IOEs. Each column of LABs is served by a dedicated column interconnect, which vertically routes signals to and from LABs, memory blocks, DSP blocks, and IOEs. The column interconnect lines may traverse a distance of four, eight, and sixteen blocks respectively, in a vertical direction.

FIG. 3 illustrates an exemplary embodiment of a target device. It should be appreciated that a system may include a plurality of target devices, such as that illustrated in FIG. 3, cascaded together. It should also be appreciated that the target device may include programmable logic devices arranged in a manner different than that on the target device 300. A target device may also include FPGA resources other than those described in reference to the target device 300. Thus, while the invention described herein may be utilized on the architecture described in FIG. 3, it should be appreciated that it may also be utilized on different architectures, such as those employed by Altera® Corporation in its APEX™, Stratix™, Cyclone™, Stratix™ II, and Cyclone™ II families of chips and those employed by Xilinx® Inc. in its Virtex™ and Virtex™ II, and Virtex IV™ line of chips.

Figure 4:
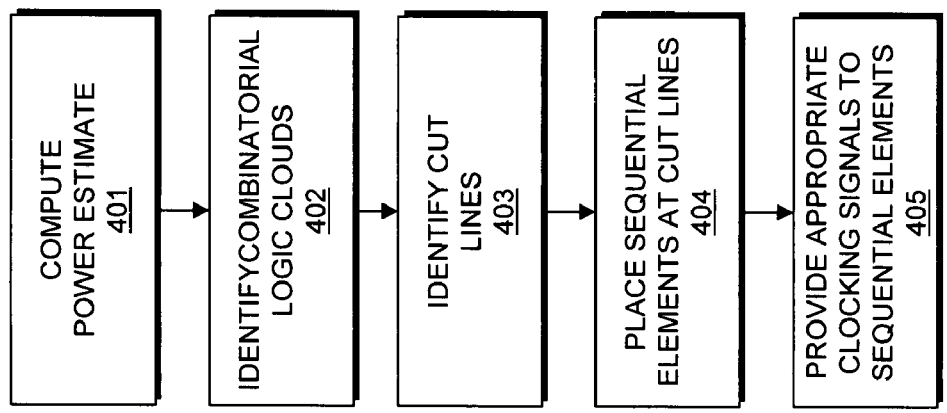
FIG. 4 is a flow chart that illustrates a method for performing sequential element insertion according to an embodiment of the present invention.

FIG. 4 is a flow chart that illustrates a method for performing sequential element insertion according to an embodiment of the present invention. The procedure described with reference to FIG. 4 may be used to implement procedure 205 illustrated in FIG. 2. At 401, power estimates are computed. The power estimates may include a metric that describes the estimated overall power consumption for the system design. The power estimates may include a metric that describes the power consumption for each circuit or sub-circuit in the system design. The circuit may include a combinational or combinatorial cone of logic. The power estimate may include an estimate of signal activities for each resource, such as a net or block, in the system design. The signal activities may include a toggle rate and static probability (time-averaged fraction of time at which a signal is logic high) for each signal in the design. The signal activities may be determined by using the procedure described in application Ser. No. 11/414,855 entitled "Method and Apparatus for Deriving Signal Activities for Power Analysis and Optimization", which is herein incorporated by reference.

The power estimates computed at 401 may also include a glitchiness score for each signal and functional block. The glitchiness score indicates the impact a signal may have in producing glitches or a degree of susceptibility a functional block is to experiencing glitches. The glitchiness score may be higher for functional blocks whose outputs tend to toggle faster than the maximum toggle rate of any of its input. For example, a functional block implementing an XOR function will have a high glitchiness score because generally its output tends to toggle each time any one of its inputs toggles. A functional block implementing an AND function will have a low glitchiness score because generally its output tends to toggle under very limited conditions.

At 402, combinatorial logic or combinatorial logic clouds which are candidate for sequential element insertion are identified. The combinatorial logic clouds are bounded by sequential elements, such as registers, which are clocked by the same clock. The bounding sequential elements may be referred to as source and destination sequential elements. According to an embodiment of the present invention, candidates for sequential element insertion are identified are identified from combinatorial logic clouds that have significant dynamic power and in which there is significant glitching. This may be achieved by identifying combinatorial logic clouds having a signals and/or functional blocks with associated glitchiness scores that exceed a threshold value. Combinatorial logic clouds which are candidates for optimization through sequential element insertion may include combinatorial logic where enough glitches could be filtered to offset power tradeoffs associated with the additional power required from the additional sequential elements inserted and resources for performing phase shifting (local clock generation logic, global signals, and/or clock delay elements).

At 403, cut lines are determined in the identified combinatorial logic clouds. According to an embodiment of the present invention, placement of a cut line determines an upper bound on the number of sequential elements which may be inserted. Each edge across a cut line is a candidate location for a pipeline sequential element. Each inserted sequential element will absorb glitches and reduce dynamic power. According to an embodiment of the present invention, cut lines may be positioned to separate levels of logic. In this embodiment, a cut line is inserted after a first level of functional blocks and before a second level of functional blocks. New (intermediate) cut lines may also be generated or positioned by moving one or more logic gates across a cut line previously positioned to separate levels of logic. Additional cut lines and/or intermediate cut lines may be inserted at each level of functional blocks or and then evaluated based upon the glitchiness score of signals and/or functional blocks in proximity of the cut lines. According to an alternate embodiment of the present invention, cut lines may be positioned based primarily on glitchiness scores of signals and/or functional blocks in the combinatorial logic cloud.

At 404, pipelined sequential elements are placed at the cut lines. According to an embodiment of the present invention, in order to preserve functionality, one sequential element is placed along the intersection between a cut line and a path between a source sequential element and a destination sequential element. Since there may be constraints on the number of sequential elements that may be implemented on a target device, it is advantageous to being insertions at cut lines which produce the greatest reduction in power. According to an embodiment of the present invention, registers, such as edge triggered registers, may be inserted as sequential elements. It should be appreciated that other types of sequential elements may also be utilized. For example, back-to-back latches may be configured to operate as an edge-triggered register. Single latches may also be utilized where the bounding sequential elements are positive-edge triggered.

By inserting sequential elements at a single cut line, the data delay through cloud of logic may be doubled if the inserted sequential logic elements are clocked by the same clock signal clocking the source and destination sequential elements. For example, it may take two clock cycles for some data to receive at the destination sequential element instead of a single clock cycle. Since the latency of the circuit has increased, the functionality of the circuit may have also changed. In efforts to reduce the data delay and preserve the functionality of the circuit, the clock frequency through the cloud of logic may be doubled. This, however, has the adverse effect of doubling the dynamic power required to distribute the clock. If some parts of the system use the original clock and the updated clock, then this solution would require still more power since special purpose clock generation logic and distribution mechanisms would both be required.

According to an embodiment of the present invention, the inserted pipelined sequential elements are clocked with a clocking signal that is phase shifted with respect to the clock signal clocking the source and destination sequential elements. Consider an observable point P in a combinational cloud of logic. The sequential elements that include Support (P) may change their values in response to an edge of clock Clk. Such a clock edge is called a launch edge because it triggers changes in the values of the registers and also in downstream logic. The differing delays of combinational paths from Support(P) to P will cause the transitions at P to occur at different times. Let MAXDELAY(Support(P), P) denote the maximum time interval between any launch edge of Support(P) and any corresponding change in the value of P. Furthermore, let Affected(P) be the set of destination registers which may change in value in response to a change in P. The sequential elements in Affected(P) are also clocked by clock Clk. MAXDELAY(P, Affected(P)) is the maximum delay of any path from P to any register in Affected(P). In the original circuit, the setup timing requirement through P is satisfied if the maximum path delay from Support(P) to Affected(P) is no larger than Period(Clk), i.e. value changes caused by the launch edge at Support(P) all arrive at Affected(P) within one clock period. This condition is satisfied if the following relationship is satisfied.

$$\text{MAXDELAY}(\text{Support}(P),P)+\text{MAXDELAY}(P,\text{Affected}(P))<\text{Period}(\text{Clk}). \quad [1]$$

Now consider the modified version of the circuit where we have inserted a pipeline register Pipereg(P) at P such that the inserted register is clocked by a phase shifted version of Clk. Let us write Phasedelay(Pipereg(P), Clk) for the phase delay of the clock at Pipereg(P), with respect to Clk. That is, the active edge of the clock of Pipereg(P) occurs Phasedelay(Pipereg(P), Clk) time units after the active (launch) edge of Clk at Support(P). For simplicity, the intrinsic setup, hold, and clock-to-output delays of the pipeline register are assumed to be negligible. Then timing functionality of the circuit is preserved if the latch edge of Pipereg(P) occurs after the last change has occurred at P, but early enough for the possible change in Pipereg(P) to travel through the late logic to arrive at Affected(P). In timing terms, this condition is expressed by the conjunction of the following two requirements represented in the following two relationships [2] and [3].

$$\text{MAXDELAY}(\text{Support}(P),P)<\text{Phasedelay}(\text{Pipereg}(P),\text{Clk}) \quad [2]$$

This means that the latch edge at Pipereg(P) occurs late enough for register Pipereg(P) to capture the last value change at P.

$$\text{Phasedelay}(\text{Pipereg}(P),\text{Clk})+\text{MAXDELAY}(\text{Pipereg}(P),\text{Affected}(P))<\text{Period}(\text{Clk}) \quad [3]$$

This means that all changes caused by the change in the output of the pipeline register at P can be propagated to registers in Affected(P) before for the capture edge arrives at the registers in Affected(P). If both these conditions are satisfied, then the original setup timing constraint of the circuit is satisfied, i.e. changes caused by a launch edge at Support(P) propagate through the combinational logic through P and arrive at Affected(P) at most Period(Clk) units later. This can be demonstrated by considering the timing requirements inequality.

Any path that goes through P in the original circuit now goes through Pipereg(P) in the modified circuit. Therefore the original setup timing requirement through P may be represented by the following relationship.

$$\text{MAXDELAY}(\text{Support}(P),\text{Pipereg}(P))+\text{MAXDELAY}(\text{Pipereg}(P),\text{Affected}(P))<\text{Period}(\text{Clk}) \quad [4].$$

This again expresses the original requirement, which is that changes caused by a launch edge at Support(P) must propagate within one clock period to the destination registers at Affected(P). By relationship [2], replacing the first term in relationship [4] by Phasedelay(Pipereg(P),Clk) will result in a more stringent requirement, given by the following relationship.

$$\text{Phasedelay}(\text{Pipereg}(P),\text{Clk})+\text{MAXDELAY}(\text{Pipereg}(P),\text{Affected}(P))<\text{Period}(\text{Clk}) \quad [5]$$

The relationship above is just a restatement of the relationship [3], which is the second requirement on the clock phase delay for the inserted register. Satisfying the two timing requirements on the inserted pipeline register will therefore satisfy the original timing constraint, i.e. that changes in Support(P) propagate to Affected(P) within one clock period.

Figure 5:
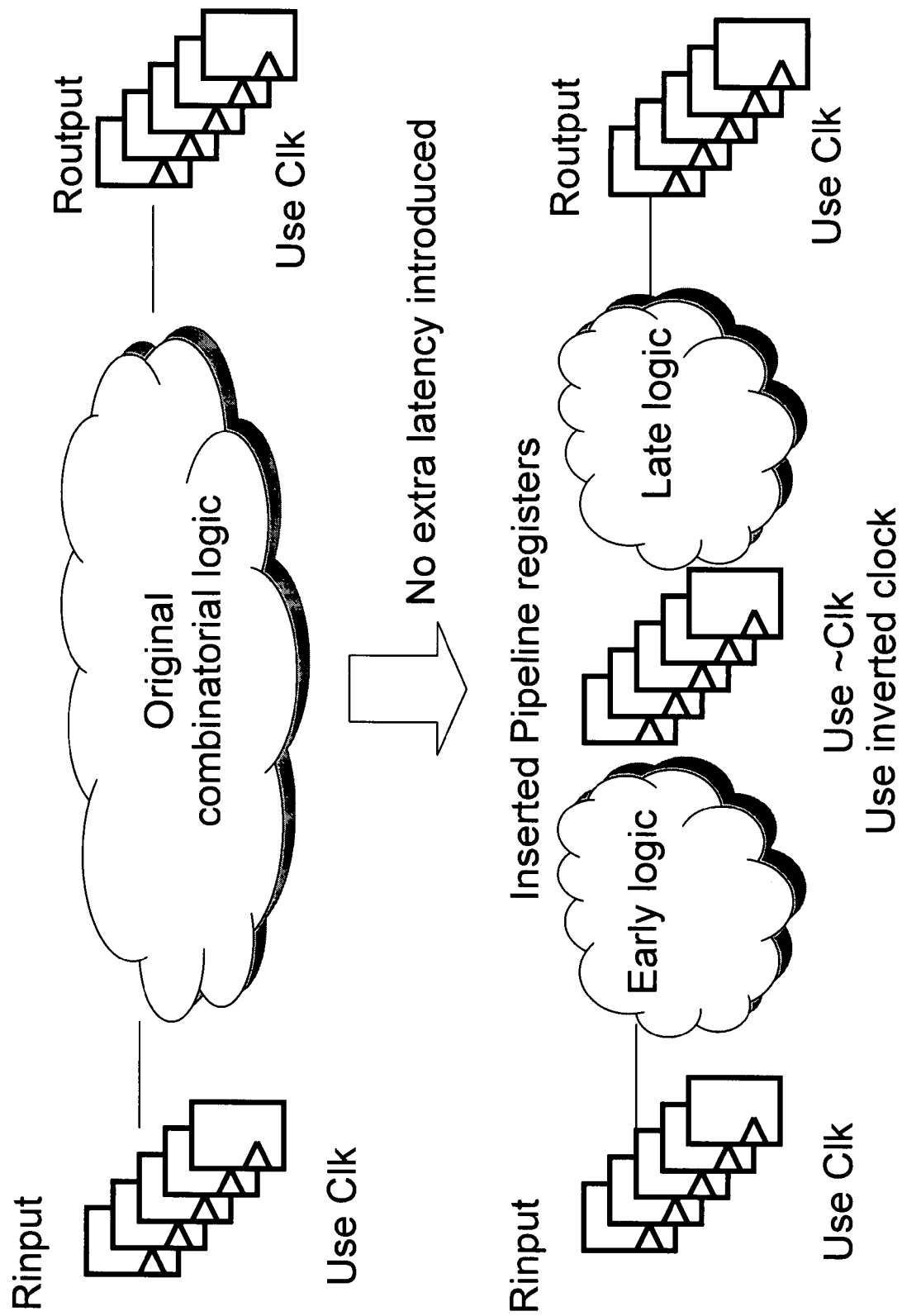
FIG. 5 illustrates an example of performing sequential element insertion according to an embodiment of the present invention.

FIG. 5 illustrates an example of performing sequential element insertion according to an embodiment of the present invention. As shown, a cloud of combinatorial logic bounded by sequential elements Rinput and Routput is identified. A cut line is used to cut the combinatorial logic into early and late portions. Sequential elements, such as registers, are inserted at the cut line. The sequential elements are clocked at clock signal that has a phase shifted with respect to the clock signal clocking the sequential elements bounding the combinatorial logic, Rinput and Routput.

According to an embodiment of the present invention, when a single cut line is used to cut combinatorial logic, the inserted pipelined sequential elements may be clocked by an inversion of the clock signal clocking the bounding sequential elements, where the clock signal has a phase difference of a 180 degrees from the original clock signal that clocks the source and destination sequential elements. It should be appreciated that multiple pipeline stages may be inserted into a combinatorial logic cloud where each stage is clocked by a suitably phase shifted version of the clocking signal used to clock the source and destination sequential elements (the original clock). According to one embodiment of the present invention, when n cut lines are used to cut combinatorial logic, the pipelined sequential elements at the $m^{th}$ cut line should be clocked by a clocking signal having a $m*[360/(n+1)]$ degree phase shift/difference from the clock signal clocking the bounding sequential elements of the combinatorial logic, where the m=1 cut line is the cut line closest to the source sequential element and m=n cut line is the cut line closest to the destination sequential element.

For example, the combinatorial logic cloud maybe split into three parts, early, middle, and late combinatorial logic. A first pipeline stage may be inserted between the early and middle combinatorial logic where the sequential elements in the first pipeline stage is clocked by a version of the original clock phase shifted by 120 degrees. The data delay through the early combinatorial logic is bounded above by ⅓ of the clock period of the original clock. A second pipeline stage between the middle and late combinatorial logic where the sequential elements in the second pipeline stage is clocked by a version of the original clock phase shifted by 240 degrees. The data delay through the middle combinatorial logic is bounded above by ⅓ of the clock period of the original clock. Similarly, the data delay through the late combinatorial logic is bounded by ⅓ of the clock period of the original clock.

Referring back to FIG. 4, at 405 appropriate clocking signals are provided to the sequential elements inserted into the system. The clocking signals may be phase shifted according to a number of cut lines inserted into the system to allow the functionality of the system to be preserved without increasing the latency of data transmitted through the cloud of combinatorial logic. The appropriate clocking signal may be provided using special purpose clock generation logic such as DLL or PLL, regional or local clock delay elements, special purpose registers having tunable clock delays, local routing to delay a clock, logic elements to delay or invert a clock signal, and/or other appropriate mechanisms and techniques.

Figure 6A:
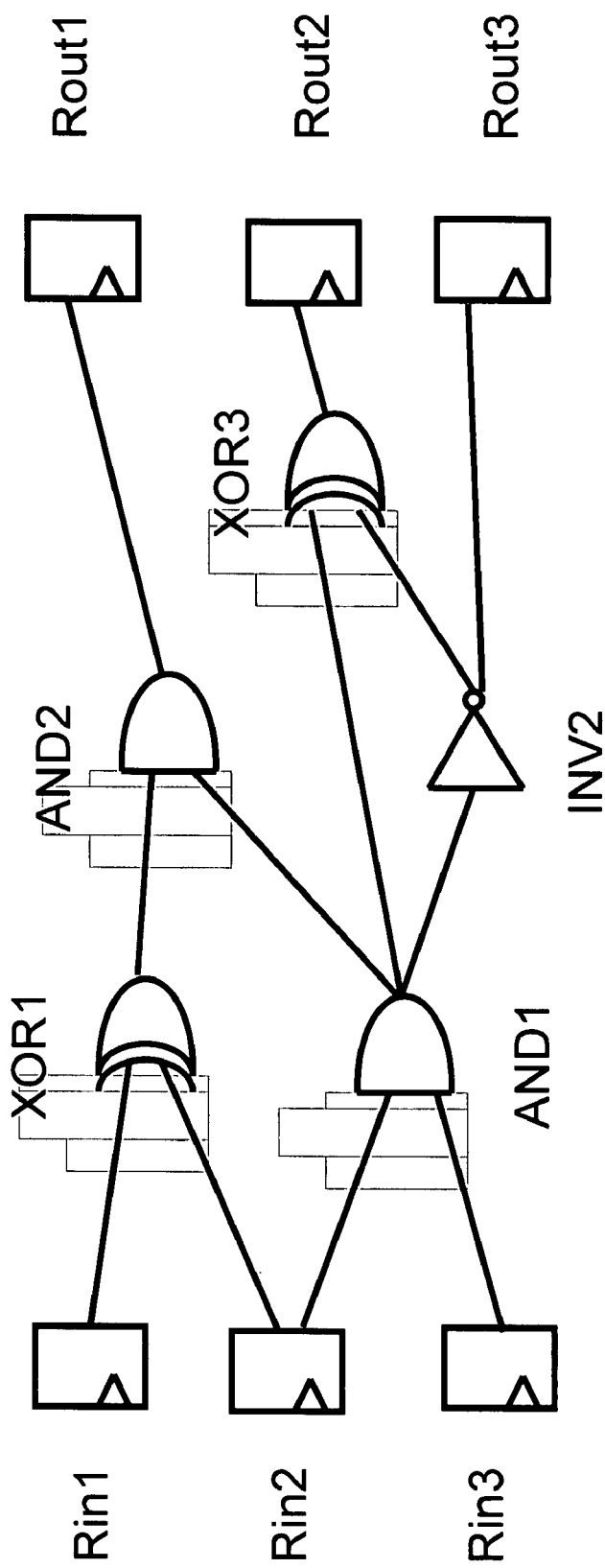
FIG. 6a illustrates an exemplary cone of combinatorial logic.
Figure 6B:
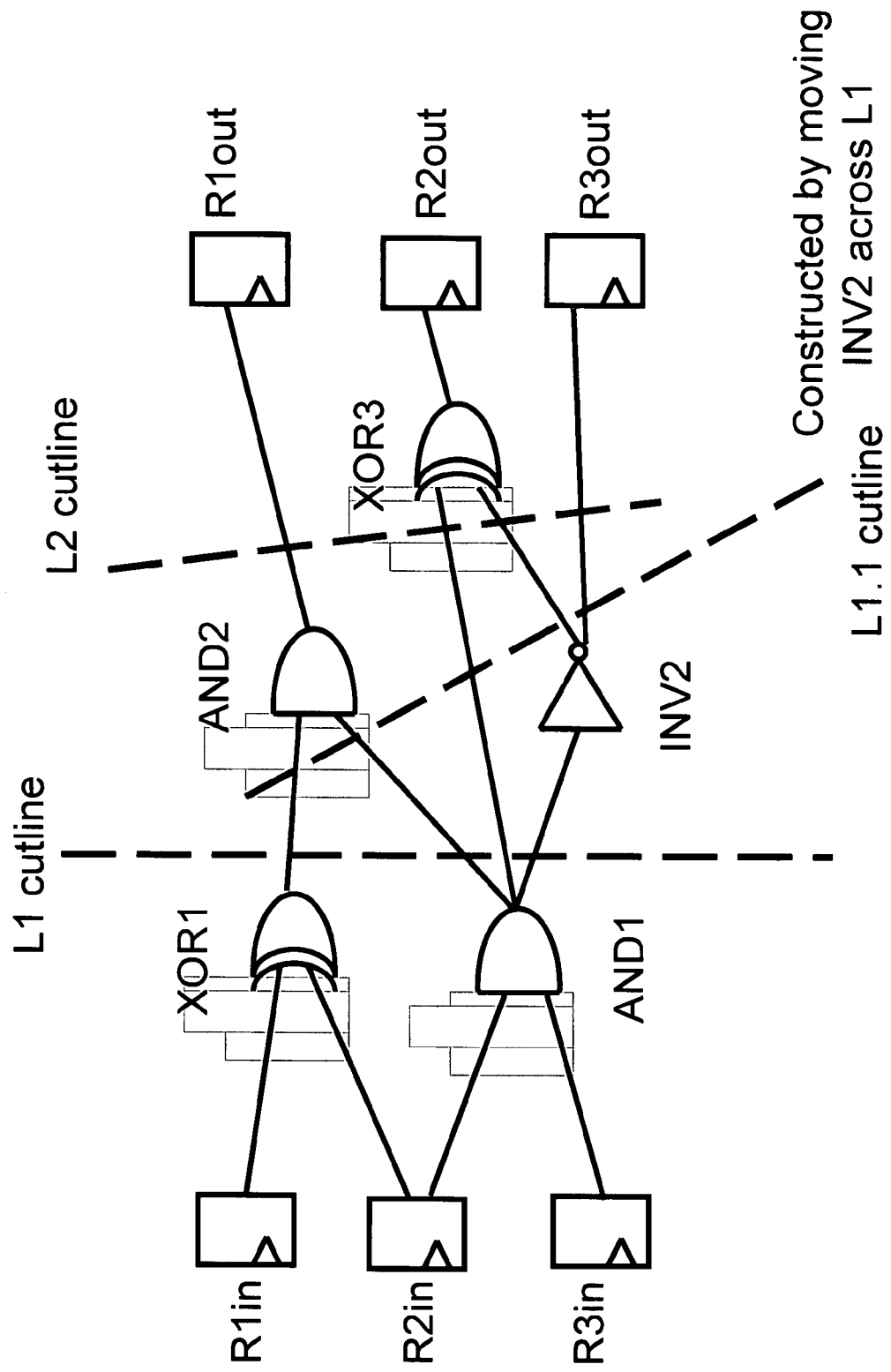
FIG. 6b illustrates an example of cut line enumeration according to an embodiment of the present invention.

FIG. 6a illustrates an exemplary cone of combinatorial logic 600. The cone of combinatorial logic is bounded by a plurality of source sequential elements Rin1-Rin3 and a plurality of destination sequential elements Rout1-Rout3. Referring to FIG. 6b, exemplary cut lines may be inserted into the combinatorial logic 600. In this example, cut lines may be inserted to separate levels of logic. Cut line L1 is inserted after a first level of functional blocks, XOR1 and AND1, and before a second level of functional blocksINV2 and AND 2. Cut line L2 is inserted after the second level of functional blocks, AND2 and INV2, and before a third level of functional blocks, XOR3. Intermediate cut line L1.1 may be generated by taking existing cut line, L1, and moving functional block INV2 across the cut line from right to left. It should be appreciated that one or more of the cut lines identified may be utilized after determining the effectiveness of insertion at the cut lines and also determining the resources available on the target device for sequential element insertion.

According to an embodiment of the present invention, the clock duty cycle for the original clock clocking the bounding sequential elements is 50%, where the clock is low for Period (Clk)/2 and high for Period(Clk)/2, the clock frequency of the clock signal clocking the bounding sequential elements are the same, the clock skew is negligible, and the setup, hold, and clock to output delays on the pipelined sequential elements are negligible. The intrinsic set setup delay on a sequential element is the time before an active clock edge during which a data signal must be kept steady. The intrinsic hold delay is the time after an active clock edge during which the data signal must be kept steady. If the data is not steady for these regions of time before and after the active clock edge, then the sequential element may not capture the data and the sequential element may be in an unstable state. The intrinsic clock to output delay is the delay between the arrival of the active clock edge at the sequential element and the time at which a change in the value stored in the register is propagated to the output of the sequential element. In the original circuit, the propagation delay through the combinatorial logic is bounded above by Period(Clk). In the transformed circuit with the insertion of a single stage of pipelined sequential elements, the worst case delay through the early combinatorial logic is bound by Period(Clk)/2 so that the final result at the cut line appears in time to be latched by the pipeline sequential logic elements with the inverted clock. The worst case delay through the late combinatorial logic is bound by Period (Clk)/2 so that the final results computed from the latched values at the pipeline registers can reach the destination registers. When these constraints are met, the output sequential elements see the corrected results after a single clock period. The transformation preserves both the clock-counting latency and the absolute latency of the circuit.

It should be appreciated that even when one of the conditions listed above are not satisfied, it may still be possible to preserve the functionality of a circuit. When the duty cycle is not at 50%, other adjustments may be made to compensate for the condition. For example, in the case where a clock period is 10 ns and the duty cycle is 80%, i.e. the clock signal is high for 8 ns and low for 2 ns, the maximum delay through the early combinatorial logic may be bounded above by 8 ns. The final values of the early combinatorial logic will be captured by the inserted sequential elements on the falling clock edge 8 ns after the clock period starts. The maximum delay though the late combinatorial logic may be bounded above by 2 ns. This allows any change in the output of the inserted sequential elements to be propagated through the late combinatorial logic and be captured by the output sequential elements of the circuit on the next rising clock edge (10 ns after the start of the clock period).

When the clock skew is non-negligible, other adjustments may be made to compensate for the condition. Consider the example when the clock period is 10 ns, the duty cycle is 50%, the delay from the clock source to the first stage pipelined sequential elements is negligible, but the delay from the clock source to the destination sequential element is 3 ns. Suppose that there is also a delay of 3 ns from the clock source to the inserted sequential elements' clock port. The maximum delay through the early combinatorial logic may be up to 8 ns. This accounts for 5 ns of delay between the rising clock edge and the falling clock edge and also 3 ns extra delay in the propagation of the clock signal to the inserted sequential elements. The maximum delay through the late combinatorial logic is still 5 ns because both the inserted sequential elements and the late combinatorial logic see the same clock delay of 3 ns so the launch and capture edges are 5 ns apart.

When the intrinsic setup time on pipelined sequential elements is non-negligible, other adjustments may be made to compensate for the condition. The intrinsic setup delay may be subtracted from the overall delay budget for the early combinatorial logic. The maximum delay through the early logic must be at most Period(Clk)/2 minus the intrinsic setup delay on the pipeline sequential elements.

When the intrinsic hold time on the pipelined sequential elements is non-negligible, other adjustments may be made to compensate for the condition. The minimum delay through the early combinatorial logic should be no less than the intrinsic hold time of the pipelined sequential elements. Otherwise, changes will be propagated through the early combinatorial logic in effectively zero clock cycles rather than a half clock cycle.

When the intrinsic clock to output delay on the pipelined sequential elements is non-negligible, other adjustments may be made to compensate for the condition. The intrinsic clock to output delay should be subtracted from the maximum delay budget of the late combinatorial logic. The maximum delay though the late combinatorial logic is bounded above by Period(Clk)/2 minus the intrinsic clock to output delay of the pipeline registers.

It should be appreciated that the bounding sequential elements of a combinatorial logic cloud, the source and destination sequential elements, may operate at the same frequency but may be clocked with a clocking signal having a fixed phase difference. In this situation, the pre-existing phase difference should be taken into account when computing the critical path delay budgets for the corresponding Early and Late clouds of combinatorial logic.

When the source and destination sequential elements of a combinatorial logic cloud are different but are related by a simple multiplicative factor (e.g. one is twice the speed of the other), then we can apply the optimization of sequential element insertion, assuming that both the source and destination sequential elements will be registered by the faster clock. The delay budgets should also be updated accordingly. When destination sequential elements are clocked by a clocking signal running at the ½ times the rate of the clocking signal used by the source sequential elements, optimization of sequential element insertion may be applied if both the source and destination sequential elements use a clock running at the rate which is a least common multiple of the frequency of either boundary.

When the source and destination sequential elements of a combinatorial logic cloud use completely unrelated clocks, this would facilitate completely asynchronous transfers. Synchronization logic should be utilized on the output side to ensure sensible operation of the circuit. These cases would not normally have a lot of combinatorial logic, so it would probably not make sense to optimize for this case. However, given the general handshaking required, it may be possible to insert pipelining stages in the previous fashion if there is enough combinatorial logic to make it worthwhile.

Figure 7:
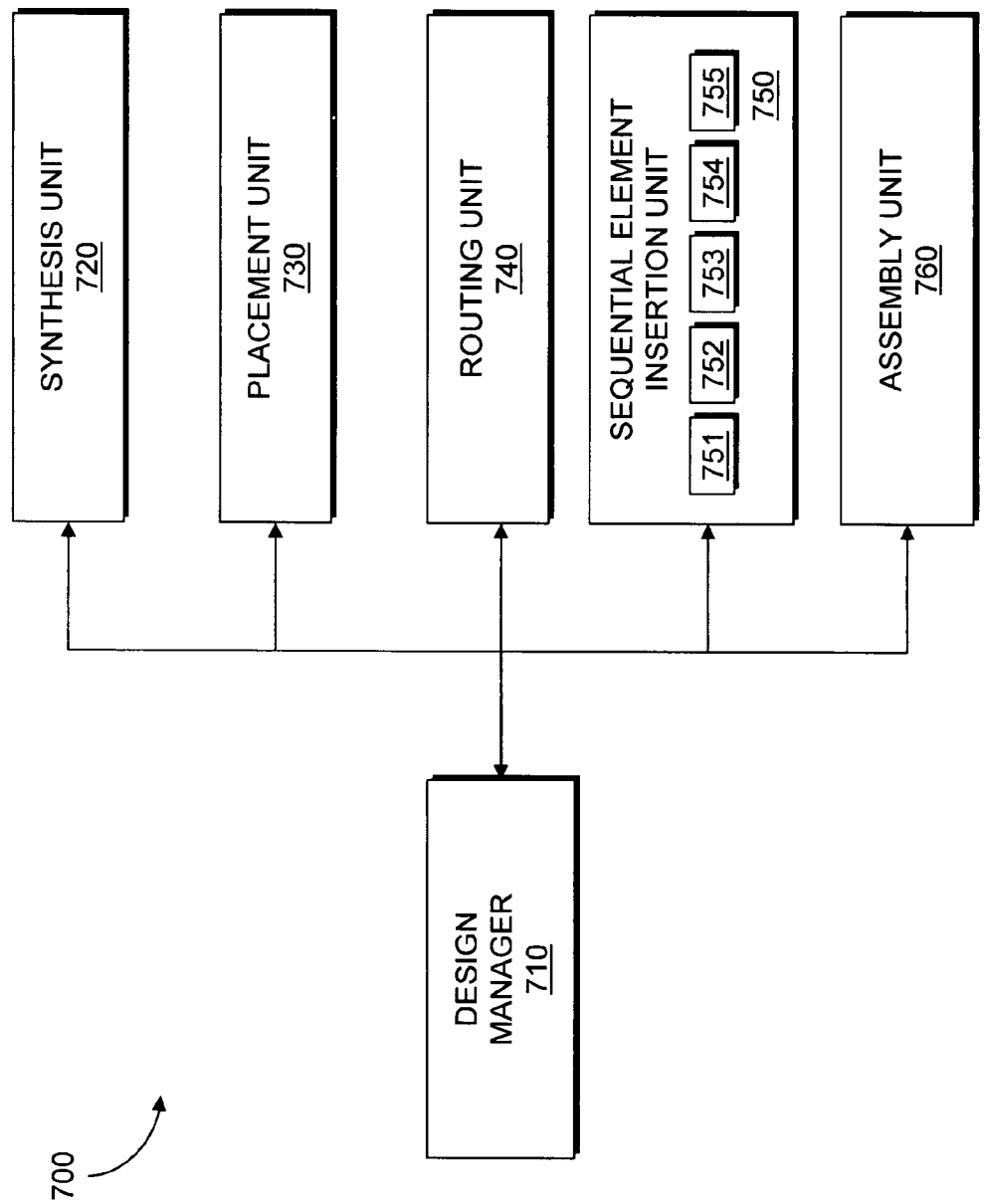
FIG. 7 illustrates a system designer according to an embodiment of the present invention.

FIG. 7 illustrates a system designer unit 700 according to an embodiment of the present invention. The system designer unit 700 may be an EDA tool. FIG. 7 illustrates software modules implementing an embodiment of the present invention. According to one embodiment, system design may be performed by a computer system (not shown) executing sequences of instructions represented by the software modules shown in FIG. 7. Execution of the sequences of instructions causes the computer system to support system design as will be described hereafter. In alternate embodiments, hardwire circuitry may be used in place of or in combination with software instructions to implement the system design unit 700. Thus, the system design unit 700 is not limited to any specific combination of hardware circuitry and software. Block 710 represents a system designer manager. The system designer manager 710 is coupled to and transmits information between the components in the system design unit 700.

Block 720 represents a synthesis unit. The synthesis unit 720 generates a logic design of a system to be implemented by a target device. According to an embodiment of the system designer unit 700, the synthesis unit 720 takes a conceptual Hardware Description Language (HDL) design definition and generates an optimized logical representation of the system. The optimized logical representation of the system generated by the synthesis unit 720 may include a representation that has a minimized number of functional blocks and registers, such as logic gates and logic elements, required for the system. Alternatively, the optimized logical representation of the system generated by the synthesis unit 720 may include a representation that has a reduced depth of logic and that generates a lower signal propagation delay. The synthesis unit 720 also determines how to implement the functional blocks and registers in the optimized logic representation utilizing specific resources on a target device, thus creating an optimized "technology-mapped" netlist. The technology-mapped netlist indicates how the resources on the target device can be utilized to implement the system. The technology-mapped netlist may, for example, contain components such as LEs on the target device. FIG. 3 illustrates an exemplary target device 300 in which a system may be implemented on utilizing an FPGA according to an embodiment of the present invention.

Referring back to FIG. 7, block 730 represents a placement unit. The placement unit 730 fits the system on the target device by determining which resources on the target device are to be used for specific functional blocks and registers. According to an embodiment of the system designer unit 700, the placement unit 730 first determines how to implement portions of the optimized logic design in clusters. Clusters may represent a subset of the components on the target device 300 (shown in FIG. 3) such as, for example, a LAB having a plurality of logic blocks. In this embodiment, after portions of the optimized logic design are implemented in clusters, the clusters may be placed by assigning the clusters to specific LABs on the target device. Following the placement of the clusters, routing interconnections between the logic blocks may be performed. The placement unit 730 may utilize a cost function in order to determine a good assignment of resources on the target device.

Block 740 represents a routing unit. The routing unit 740 determines the routing resources on the target device to use to provide interconnection between the functional blocks and registers on the target device.

Block 750 represents a sequential element insertion unit. The sequential elements insertion unit 750 inserts one or more stages of pipelined sequential elements into glitch-prone combinatorial cones of logic to eliminate glitches in circuits of the system. The sequential elements only change value at most once per clock cycle and prevent glitches from propagating downstream, effectively filtering glitches out of the system. In order to preserve the original timing of the system, the clock signal transmitted to the inserted sequential elements are phase shifted. The phase in which to shift each set of pipelined sequential elements are determined based upon on the number of sets of pipelined sequential elements inserted into a combinatorial cone of logic. It should be appreciated that the insertion of sequential elements may be made after any one or more of the synthesis, placement, or routing procedures performed by the synthesis unit 720, placement unit 730, and routing unit 740. In order to accommodate the addition of sequential elements, incremental synthesis, placement, and/or routing may be performed without requiring entire design procedures to be re-executed.

The sequential element insertion unit 750 includes a power estimation unit 751. The power estimation unit 751 computes power estimates. The power estimates may include a metric that describes the overall power required for the system design. The power estimates may include a metric that describes the power consumption for each circuit or sub-circuit in the system design. The circuit may include a combinational or combinatorial cone of logic. The power estimate may include an estimate of signal activities for each resource, such as a net or block, in the system design. The signal activities may include a toggle rate and static probability. The power estimate may also include a glitchiness score for each signal and functional block. The glitchiness score indicates the impact a signal may have in producing glitches or a degree of susceptibility a functional block is to experiencing glitches.

The sequential element insertion unit 750 includes a combinatorial logic identifier unit 752. The combinatorial logic identifier unit 752 identifies combinatorial logic clouds which are candidate for sequential element insertion. The combinatorial logic clouds are bounded by sequential elements, such as registers, which are clocked by the same clock. The bounding sequential elements may be referred to as source and destination sequential elements. According to an embodiment of the present invention, candidates for sequential element insertion are identified are identified from combinatorial logic clouds that have significant dynamic power and in which there is significant glitching. This may be achieved by identifying combinatorial logic clouds having a signals and/or functional blocks with associated glitchiness scores that exceed a threshold value. Combinatorial logic clouds which are candidates for optimization through sequential element insertion may include combinatorial logic where enough glitches could be filtered to offset power tradeoffs associated with the additional power required from the additional sequential elements inserted and resources for performing phase shifting (local clock generation logic, global signals, and/or clock delay elements).

The sequential element insertion unit 750 includes a cut line unit 753. The cut line unit 753 identifies cut lines to make in the identified combinatorial logic clouds. According to an embodiment of the present invention, cut lines may be positioned to separate levels of logic. In this embodiment, a cut line is inserted after a first level of functional blocks and before a second level of functional blocks. New (intermediate) cut lines may also be generated or positioned by moving one or more logic gates across a cut line previously positioned to separate levels of logic. Additional cut lines and/or intermediate cut lines may be inserted at each level of functional blocks or and then evaluated based upon the glitchiness score of signals and/or functional blocks in proximity of the cut lines. According to an alternate embodiment of the present invention, cut lines may be positioned based primarily on glitchiness scores of signals and/or functional blocks in the combinatorial logic cloud.

The sequential element insertion unit 750 includes a sequential element placement unit 754. The sequential element placement unit 754 places pipelined sequential elements at the cut lines. According to an embodiment of the present invention, in order to preserve functionality, one sequential element is placed along the intersection between a cut line and a path between a source sequential element and a destination sequential element.

The sequential element insertion unit 750 includes a clocking unit 755. The clocking unit 755 provides appropriate clocking signals to the sequential elements inserted into the system. The clocking signals may be phase shifted according to a number of cut lines inserted into the system to allow the functionality of the system to be preserved without increasing the latency of data transmitted through the cloud of combinatorial logic.

Block 760 represents an assembly unit that performs an assembly procedure that creates a data file that includes the design of the system generated by the system designer 700. The data file may be a bit stream that may be used to program the target device. The assembly unit 700 may output the data file so that the data file may be stored or alternatively transmitted to a separate machine used to program the target device. It should be appreciated that the assembly unit 700 may also output the design of the system in other forms such as on a display device or other medium.

Figure 8:
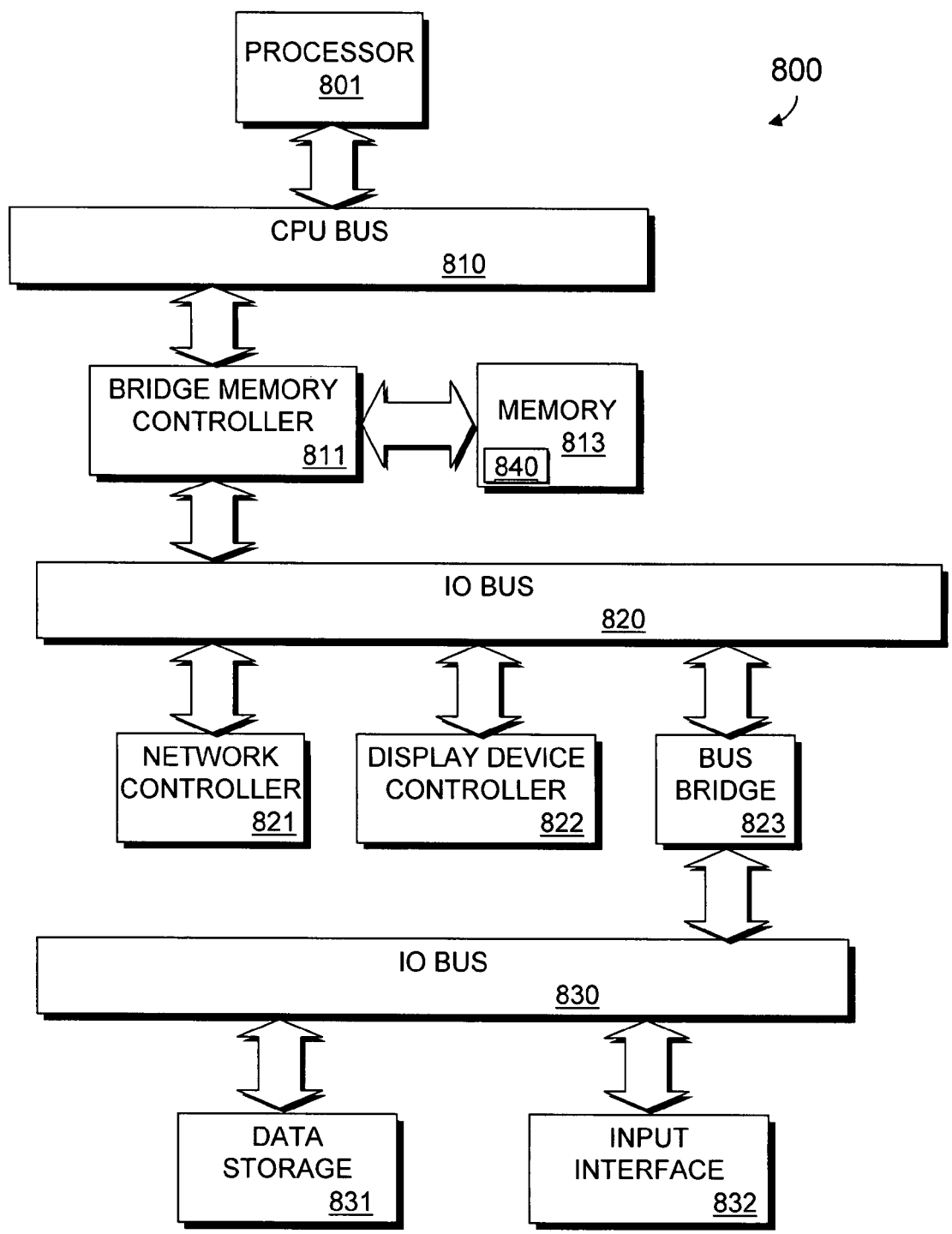
FIG. 8 is an exemplary computer system that implements a system designer according to an embodiment of the present invention.

FIG. 8 is a block diagram of an exemplary computer system 800 in which an example embodiment of the present invention resides. The computer system 800 may be used to implement the system designer 700 shown in FIG. 7. The computer system 800 includes a processor 801 that processes data signals. The processor 801 is coupled to a CPU bus 810 that transmits data signals between other components in the computer system 800.

The computer system 800 includes a memory 813. The memory 813 may be a dynamic random access memory device, a static random access memory device, and/or other memory device. The memory 813 may store instructions and code represented by data signals that may be executed by the processor 801. A bridge memory controller 811 is coupled to the CPU bus 810 and the memory 813. The bridge memory controller 811 directs data signals between the processor 801, the memory 813, and other components in the computer system 800 and bridges the data signals between the CPU bus 810, the memory 813, and a first IO bus 820.

The first IO bus 820 may be a single bus or a combination of multiple buses. The first IO bus 820 provides communication links between components in the computer system 800. A network controller 821 is coupled to the first IO bus 820. The network controller 821 may link the computer system 800 to a network of computers (not shown) and supports communication among the machines. A display device controller 822 is coupled to the first IO bus 820. The display device controller 822 allows coupling of a display device (not shown) to the computer system 800 and acts as an interface between the display device and the computer system 800. A second IO bus 830 may be a single bus or a combination of multiple buses. The second IO bus 830 provides communication links between components in the computer system 800. A data storage device 831 is coupled to the second IO bus 830. The data storage device 831 may be a hard disk drive, a floppy disk drive, a CD-ROM device, a flash memory device or other mass storage device. An input interface 832 is coupled to the second IO bus 830. The input interface 832 may be, for example, a keyboard and/or mouse controller or other input interface. The input interface 832 may be a dedicated device or can reside in another device such as a bus controller or other controller. The input interface 832 allows coupling of an input device to the computer system 800 and transmits data signals from an input device to the computer system 800. A bus bridge 823 couples the first IO bus 820 to the second IO bus 830. The bus bridge 823 operates to buffer and bridge data signals between the first IO bus 820 and the second IO bus 830. It should be appreciated that computer systems having a different architecture may also be used to implement the computer system 800.

A system designer 840 may reside in memory 813 and be executed by the processor 801. The system designer 840 may operate to synthesize a system, place the system on a target device, route the system, insert sequential elements into combinatorial logic in the system to reduce glitches where the sequential elements are clocked with a clock at a phase difference from a clock clocking source and destination sequential elements bounding the combinatorial logic, and assemble data for the system design.

Embodiments of the present invention may be provided as a computer program product, or software, that may include an article of manufacture on a machine accessible or machine readable medium having instructions. The instructions on the machine accessible or machine readable medium may be used to program a computer system or other electronic device. The machine-readable medium may include, but is not limited to, floppy diskettes, optical disks, CD-ROMs, and magneto-optical disks or other type of media/machine-readable medium suitable for storing or transmitting electronic instructions. The techniques described herein are not limited to any particular software configuration. They may find applicability in any computing or processing environment. The terms "machine accessible medium" or "machine readable medium" used herein shall include any medium that is capable of storing, encoding, or transmitting a sequence of instructions for execution by the machine and that cause the machine to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result.

Figure 1A:
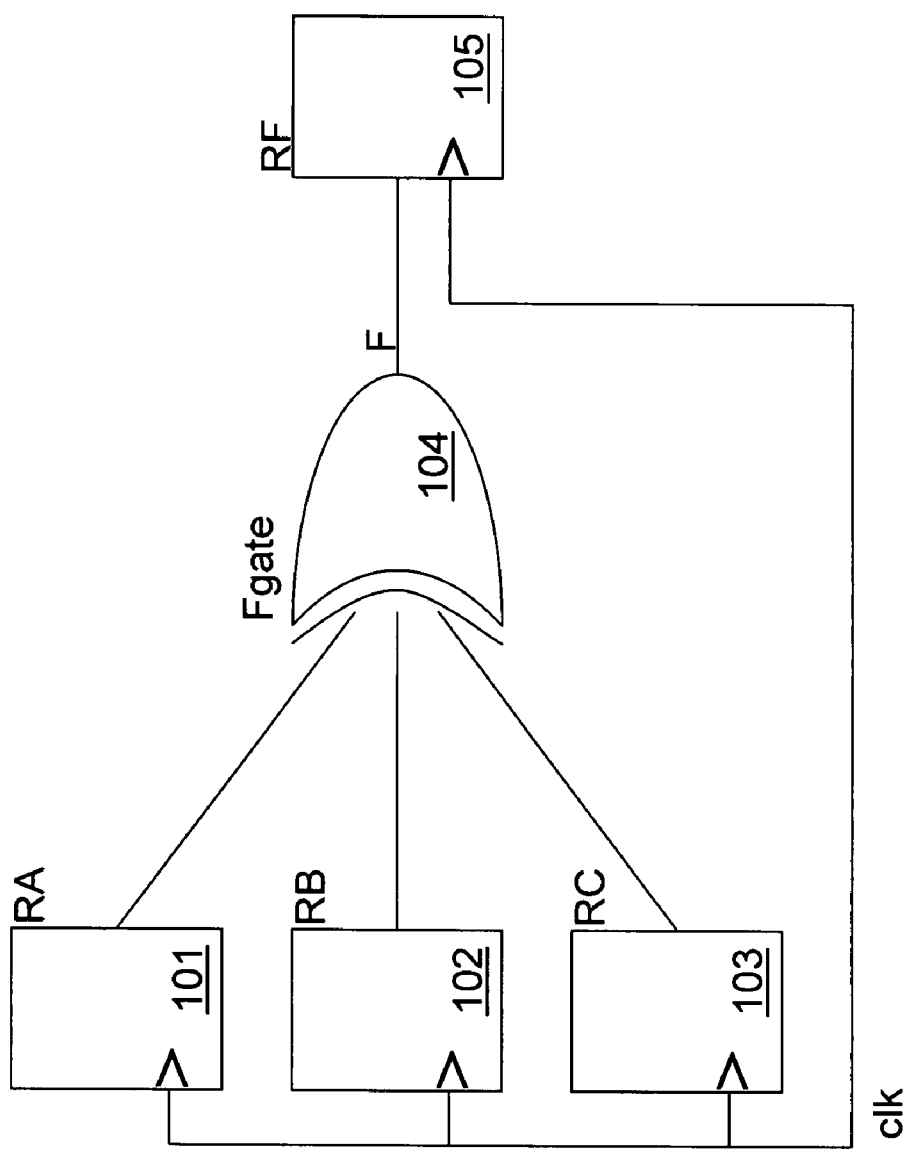
FIG. 1a illustrates an exemplary circuit that experiences glitching.
Figure 1B:
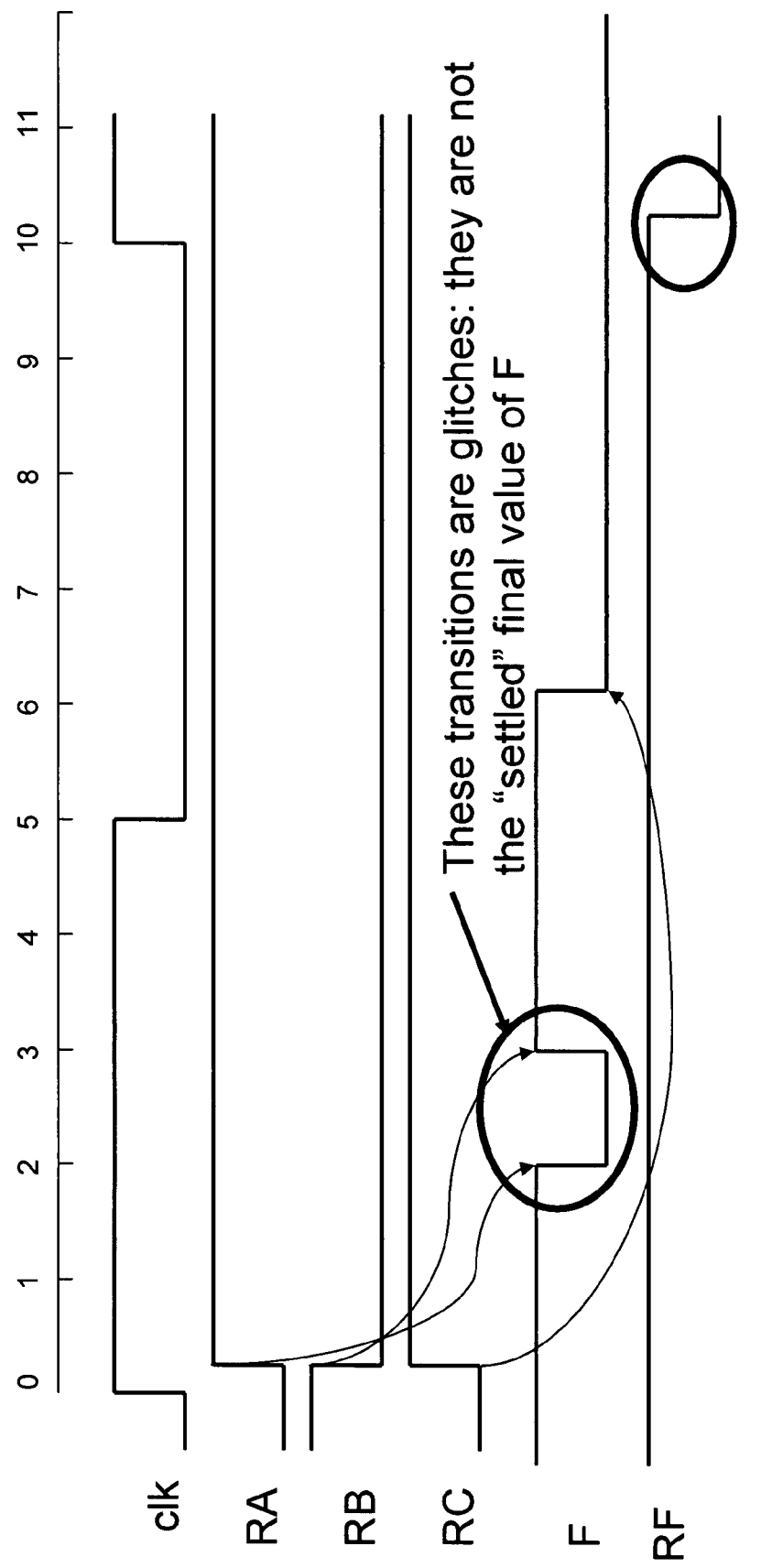

FIGS. 1 and 4 are flow charts illustrating embodiments of the present invention. Some of the techniques illustrated in these figures may be performed sequentially, in parallel or in an order other than that which is described. It should be appreciated that not all of the techniques described are required to be performed, that additional techniques may be added, and that some of the illustrated techniques may be substituted with other techniques.

In the foregoing specification, the invention has been described with reference to specific exemplary embodiments thereof. It will, however, be evident that various modifications and changes may be made thereto without departing from the broader spirit and scope of the invention. The specification and drawings are, accordingly, to be regarded in an illustrative rather than restrictive sense.

What is claimed is:

1. A method for designing a system on a target device, comprising:
    identifying combinatorial logic bounded by a source sequential element and a destination sequential element clocked by a same clock signal and experiencing glitching beyond a threshold amount;
    inserting sequential elements into the combinatorial logic bounded by the source sequential element and the destination sequential element to reduce glitching; and
    clocking the sequential elements with a clock signal having a phase difference from at least one of a clock signal clocking the source sequential element and the destination sequential element, wherein one of the identifying, inserting, and clocking procedures is performed by a processor.

2. The method of claim 1, further comprises:
    generating one or more cut lines through the combinatorial logic.

3. The method of claim 2, wherein inserting sequential elements comprises inserting sequential elements at the one or more cut lines through the combinatorial logic.

4. The method of claim 2, wherein generating cut lines comprises inserting cut lines that separate levels of the logic.

5. The method of claim 2, wherein generating cut lines comprises inserting cut lines at locations associated with a high glitchiness score.

6. The method of claim 1, wherein inserting the sequential elements comprises inserting registers.

7. The method of claim 1, wherein inserting the sequential elements comprises inserting latches.

8. The method of claim 1, wherein the sequential element is clocked with a clock signal having a 180 degree phase difference from the clock signal clocking the source sequential element and destination sequential element.

9. The method of claim 1, wherein sequential elements inserted at an $m^{th}$ cut line is clocked with a clock signal having a $m*[360/(n+1)]$ degree phase difference from the clock signal clocking the source sequential element and destination sequential element, where n is a total number of cut lines in the system.

10. The method of claim 2, further comprising determining an amount of glitching associated with the combinatorial logic by analyzing a toggle rate of the combinatorial logic.

11. A computer-readable medium including sequences of instructions, the sequences of instructions including instructions which when executed causes the machine to perform:
    identifying combinatorial logic bounded by a source sequential element and a destination sequential element clocked by a same clock signal and experiencing glitching beyond a threshold amount;
    inserting sequential elements into the combinatorial logic bounded by the source sequential element and the destination sequential element to reduce glitching; and
    clocking the sequential elements with a clock signal having a phase difference from at least one of a clock signal clocking the source sequential element and the destination sequential element.

12. The computer-readable medium of claim 11, further comprising instructions which when executed causes the machine to further perform:
    generating one or more cut lines through the combinatorial logic.

13. The computer-readable medium of claim 12, wherein inserting sequential elements comprises inserting sequential elements at the one or more cut lines through the combinatorial logic.

14. The computer-readable medium of claim 12, wherein generating cut lines comprises inserting cut lines that separate levels of the logic.

15. The computer-readable medium of claim 12, wherein generating cut lines comprises inserting cut lines at locations associated with a high glitchiness score.

16. The computer-readable medium of claim 11, wherein the sequential element is clocked with a clock signal having a 180 degree phase difference from the clock signal clocking the source sequential element and destination sequential element.

17. The computer-readable medium of claim 11, wherein sequential elements inserted at an $m^{th}$ cut line is clocked with a clock signal having a $m*[360/(n+1)]$ degree phase difference from the clock signal clocking the source sequential element and destination sequential element, where n is a total number of cut lines in the system.

18. The computer-readable medium of claim 12, further comprising instructions which when executed causes the machine to further perform determining an amount of glitching associated with the combinatorial logic by analyzing a toggle rate of the combinatorial logic.

19. A sequential element insertion unit, comprising:
    a combinatorial logic identifier unit to identify combinatorial logic having a glitchiness score that exceeds a threshold value as a candidate for sequential element insertion;
    a sequential element insertion unit to insert one or more sequential elements into the combinatorial logic bounded by a source sequential element and a destination sequential element to reduce glitching; and
    a clocking unit to provide a clock signal to the sequential elements that has a phase difference from at least one of a clock signal clocking the source sequential element and the destination sequential element.

20. The sequential element insertion unit of claim 19, further comprising a power estimation unit to compute a glitchiness score that indicates the impact a signal may have in producing glitches or a degree of susceptibility a functional block is to experiencing glitches.

21. The sequential element insertion unit of claim 19, further comprising a cut line unit to generate cut lines in the combinatorial logic.

22. The sequential element insertion unit of claim 21, wherein the cut lines are generated to separate levels of the logic.

23. The sequential element insertion unit of claim 21, wherein the cut lines are generated in response to glitchiness score of signals and functional blocks in the system.

24. The sequential element insertion unit of claim 21, wherein sequential elements inserted at an $m^{th}$ cut line is clocked with a clock signal having a $m*[360/(n+1)]$ degree phase difference from the clock signal clocking the source sequential element and destination sequential element, where n is a total number of cut lines in the system.

* * * * *